Patented Aug. 4, 1925.

1,548,716

UNITED STATES PATENT OFFICE.

SANTIAGO EMILIEN FOURNIER, OF ROYAN, FRANCE.

PROCESS FOR THE MANUFACTURE OF ARTIFICIAL FREESTONE.

No Drawing. Application filed October 2, 1924. Serial No. 741,282.

*To all whom it may concern:*

Be it known that I, SANTIAGO EMILIEN FOURNIER, citizen of French Republic, and resident of Royan, Bd. du Marche, in the Department of Charents Inferieure and Republic of France, have invented certain new and useful Improvements in Processes for the Manufacture of Artificial Freestone, of which the following is a specification.

The process for the manufacture of artificial freestone according to the invention consists in obtaining about 1 cubic metre of stone by grinding and sifting 1,500 cubic decimetres of waste and useless broken stone accruing from stone quarries or silico-calcareous non-chalky ashlar, and then added to and well mixed with 200 to 500 kilogrammes of white or gray cement (according to the qualities and tone it is desired to obtain).

This mixture is dried and afterwards moistened with 180 litres of water containing 6.66% of a liquid composed in the following manner.

The said liquid involves a solution of 900 litres of water, 50 kilogrammes of zinc fluosilicate, and 30 kilogrammes of alum, to which is added a mixture of 100 litres of hot water containing 70 kilogrammes of melted tallow.

Once incorporated with the calcareous stones and cement, the soluble constituents of this liquid become insoluble by reason of the liberation of carbonic acid and the resulting mass is transformed into fluorspar silicas and zinc carbonates; hence providing complete insolubility of the stone.

By the use of the alum the stone becomes a stiff and very consistently workable substance, while the tallow gives the necessary grease to the cements whilst retaining with ease the moisture and the malleability throughout the mixture.

The mortar thus obtained has very prolonged retention and may again be employed 12 hours after its working up by moistening from time to time with natural water. The stone thus manufactured is to be subjected to a sufficient pressure to substantially eliminate porosity.

The stones obtained are not saltpetrous, nor cracked by frost, nor sensitive to salt air.

13 days after its manufacture, this material has a resistance to crushing, of 30 to 80 kilogrammes per square centimetre, and of 80 to 250 kilogrammes after 60 days.

Obviously the formed material may be given any desired shape and dimension by molding.

The material offers the same advantages as cement beton, it binds to iron, which permits the making of reinforced bricks. It contains no foreign body, such as pebbles or shells, like the majority of quarry stones. The manufactured stone is very easy to work, it may be polished and is more easily sculptured than the usual run of quarry stones.

Claims: —

1. Process of manufacturing artificial freestone by mixing dried up silico calcareous non-chalky wastes with cement, which is moistened afterwards with a composition obtained by dissolving in water, zinc fluosilicate, alum and a hot mixture of molten tallow the whole being afterwards compressed in appropriate presses.

2. The composition of an artificial freestone, comprising: Quarry wastes 1500 cubic decimetres; cement 200 to 500 kilogrammes; 180 litres water containing 6.66% of the following solution: water 1000; zinc fluosilicate 50 kilogrammes; alum 30 kilogrammes; tallow 70 kilogrammes.

Signed at La Rochelle, France, this 16th day of September A. D. 1924.

SANTIAGO EMILIEN FOURNIER. [L. S.]